(12) United States Patent
Lee

(10) Patent No.: US 11,010,777 B1
(45) Date of Patent: May 18, 2021

(54) SATELLITE IMAGE PLATFORM PROVIDING APPARATUS USING LAUNCH VEHICLE-SATELLITE-GROUND STATION-SYSTEM INTEGRATION

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 0 days.

(21) Appl. No.: 17/165,642

(22) Filed: Feb. 2, 2021

(30) Foreign Application Priority Data

Dec. 28, 2020 (KR) .......................... 10-2020-0184777

(51) Int. Cl.
  *B64G 1/10* (2006.01)
  *G06Q 30/02* (2012.01)
  *G06T 7/50* (2017.01)

(52) U.S. Cl.
  CPC ....... *G06Q 30/0206* (2013.01); *B64G 1/1021* (2013.01); *G06T 7/50* (2017.01); *B64G 2001/1028* (2013.01); *G06T 2207/10032* (2013.01)

(58) Field of Classification Search
  CPC .................. G06Q 30/0206; G06T 7/50; G06T 2207/10032; B64G 1/1021; B64G 2001/1028
  See application file for complete search history.

(56) References Cited

U.S. PATENT DOCUMENTS

| | | | |
|---|---|---|---|
| 9,152,863 B1* | 10/2015 | Grant ...................... | G06Q 10/20 |
| 2004/0075667 A1* | 4/2004 | Burky .................. | G06T 11/001 345/589 |
| 2013/0211721 A1* | 8/2013 | Parisa .................. | G06Q 10/087 702/2 |
| 2013/0257649 A1* | 10/2013 | Chang ................ | G01C 21/3647 342/357.28 |
| 2016/0020848 A1* | 1/2016 | Leonard ............... | H04B 10/118 370/316 |
| 2017/0184393 A1* | 6/2017 | Chen .................. | G01N 33/0075 |

* cited by examiner

*Primary Examiner* — Hussein Elchanti
(74) *Attorney, Agent, or Firm* — Studebaker & Brackett PC

(57) ABSTRACT

Provided is a satellite image platform providing apparatus using launch vehicle-satellite-ground station-system integration (SI). The satellite image platform providing apparatus may include a communicator configured to receive launch vehicle information about specifications of a launch vehicle, a launch date, a launch price per unit weight, and a payload capacity from a first server; and a processor configured to calculate information about a price of a satellite image platform service for each application field and a subscription fee and a support method according to a service period of the satellite image platform service, thereby performing price calculation through analysis of specifications for the satellite, the launch vehicle, and a ground station.

12 Claims, 5 Drawing Sheets

SATELLITE IMAGE PLATFORM PROVIDING APPARATUS USING LAUNCH VEHICLE-SATELLITE-GROUND STATION-SYSTEM INTEGRATION

CROSS-REFERENCE TO RELATED APPLICATIONS

This application claims the benefit under 35 USC § 119(a) of Korean Patent Application No. 10-2020-0184777 filed on Dec. 28, 2020 in the Korean Intellectual Property Office, the entire disclosure of which is incorporated herein by reference for all purposes.

BACKGROUND

1. Field

At least one example embodiment relates to a satellite image platform providing apparatus and, more particularly, to a satellite image platform providing apparatus and method using launch vehicle-satellite-ground station-system integration (SI).

2. Description of Related Art

An artificial satellite refers to an object that may fly in a predetermined circle or an elliptical orbit around the earth. The artificial satellite may be mounted on a launch vehicle and then fired to enter a predetermined orbit in the space and to perform a variety of predefined operations in the orbit. The artificial satellite functions to exchange data with other ground-based communication/electronic devices (e.g., satellite antennas and set-top boxes connected thereto) and/or to observe the ground surface while orbiting the earth.

Currently, about 1,600 artificial satellites are orbiting the earth and a number of artificial satellites around the earth are expected to increase as a space market is evolved from government-led development to private-led development.

However, no detailed method for price calculation through analysis of specifications for a satellite, a launch vehicle, and a ground station is proposed to provide a satellite image providing service using the satellite. Also, there is no detailed method proposed with respect to a customized satellite image-based service for each of various qualities within an application field and price calculation range.

SUMMARY

At least one example embodiment provides a satellite image platform providing apparatus and method using launch vehicle-satellite-ground station-system integration (SI).

At least one example embodiment also provides a detailed method for price calculation through analysis of specifications for a satellite, a launch vehicle, and a ground station to provide a satellite image providing service.

According to an aspect of at least one example embodiment, there is provided a satellite image platform providing apparatus using launch vehicle-satellite-ground station-SI. The satellite image platform providing apparatus includes a communicator configured to receive launch vehicle information about specifications of a launch vehicle, a launch date, a launch price per unit weight, and a payload capacity from a first server; and a processor configured to calculate information about a price of a satellite image platform service for each application field and a subscription fee and a support method according to a service period of the satellite image platform service, thereby performing price calculation through analysis of specifications for the satellite, the launch vehicle, and a ground station.

The processor is configured to acquire satellite information about specifications of a satellite, a payload characteristic, a spatial resolution and a number of satellites, and an orbit from a second server through the communicator, to acquire satellite image information about a resolution of a satellite image, a price of the satellite image per unit area, a type of the satellite image, presence or absence of specific areas in the satellite image, and a ratio of the specific areas in the satellite image from a third server through the communicator, and to receive information about an application field of the satellite image and calculate information about the price of the satellite image platform service for each application field and the subscription fee and the support method according to the service period based on the launch vehicle information, the satellite information, the satellite image information, and information about the application field.

The processor may be configured to calculate a delivery price according to a weight of the launch vehicle, a delivery price according to a size and a weight of the satellite, and delivery cost of the launch vehicle according to availability of a delivery area and a final destination for delivery, and calculate the delivery cost of the launch vehicle based on presence or absence of an insurance and an insurance amount when delivering the launch vehicle, and to calculate information about the price of the satellite image platform service for each application field and the subscription fee and the support method according to the service period, further based on the delivery cost of the launch vehicle.

The processor may be configured to acquire an insurance related to maintaining the orbit of the satellite, a satellite transportation insurance price, a current status of overseas partners for reinsurance, and insurance and price determination information related to determining a price based on a heritage status of the satellite or the launch vehicle from a fourth server through the communicator, and to calculate information about the price of the satellite image platform service for each application field and the subscription fee and the support method according to the service period further based on the insurance and price determination information.

The processor may be configured to receive information about a desired price range and desired specifications from a terminal operated by a satellite image application company that desires to provide the satellite image platform service for each application field, through the communicator, and to select a type and specifications of each of a specific launch vehicle, a specific satellite, and a specific satellite image based on the desired price range, the launch vehicle information, the satellite information, the satellite image information, and information about the application field.

The processor may be configured to select a type of each of the specific launch vehicle and the specific satellite based on the desired price range, the launch vehicle information, the satellite information, the satellite image information, and information about the application field, and to select specifications of the specific launch vehicle and specifications of the specific satellite based on a maximum price within the desired price range, the specifications of the specific satellite including an operating frequency and throughput.

The processor may be configured to select a type of each of the specific launch vehicle and the specific satellite based on the desired specifications, the satellite information, the satellite image information, and information about the application field, and to select specifications of the specific launch vehicle and specifications of the specific satellite based on the desired specifications, the specifications of the specific launch vehicle including a type of a propellant including liquid, solid, and hybrid, and the specifications of the specific satellite further including continent-by-continent visit cycle information.

The processor may be configured to determine whether to track the satellite using an optical signal based on the desired price range, the launch vehicle information, the satellite information, the satellite image information, and information about the application field, and to receive all of a first signal and a second signal corresponding to the optical signal and a radio frequency (RF) signal from the specific satellite based on a maximum price within the desired price range, and control data transmitted from the satellite to be decoded.

According to another aspect of at least one example embodiment, there is provided a satellite image platform providing method using launch vehicle-satellite-ground station-SI. The satellite image platform providing method may be performed by a ground station or a terminal connected to the ground station and may include a launch vehicle information acquisition process of acquiring launch vehicle information about specifications of a launch vehicle, a launch date, a launch price per unit weight, and a payload capacity from a first server; a satellite information acquisition process of acquiring satellite information about specifications of a satellite, a payload characteristic, a spatial resolution and a number of satellites, and an orbit from a second server; a satellite image information acquisition process of acquiring satellite image information about a resolution of a satellite image, a price of the satellite image per unit area, a type of the satellite image, presence or absence of specific areas in the satellite image, and a ratio of the specific areas in the satellite image from a third server; and a platform service price/support method calculation process of receiving information about an application field of the satellite image and calculating information about a price of a satellite image platform service for each application field and a subscription fee and a support method according to a service period of the satellite image platform service based on the launch vehicle information, the satellite information, the satellite image information, and information about the application field.

The satellite image platform providing method may, prior to the platform service price/support method calculation process, further include a delivery cost calculation process of calculating a delivery price according to a weight of the launch vehicle, a delivery price according to a size and a weight of the satellite, and delivery cost of the launch vehicle according to availability of a delivery area and a final destination for delivery. The delivery cost calculation process may include calculating the delivery cost of the launch vehicle based on presence or absence of an insurance and an insurance amount when delivering the launch vehicle, and the platform service price/support method calculation process may include calculating information about the price of the satellite image platform service for each application field and the subscription fee and the support method according to the service period, further based on the delivery cost of the launch vehicle.

The satellite image platform providing method may, prior to the platform service price/support method calculation process, further include an insurance and price determination information acquisition process of acquiring an insurance related to maintaining the orbit of the satellite, a satellite transportation insurance price, a current status of overseas partners for reinsurance, and insurance and price determination information related to determining a price based on a heritage status of the satellite or the launch vehicle from a fourth server. The platform service price/support method calculation process may include calculating information about the price of the satellite image platform service for each application field and the subscription fee and the support method according to the service period further based on the insurance and price determination information.

The satellite image platform providing method may, prior to the platform service price/support method calculation process, further include a desired price range/specifications information acquisition process of acquiring information about a desired price range and desired specifications from a terminal operated by a satellite image application company that desires to provide the satellite image platform service for each application field; and a launch vehicle/satellite type and specifications selection process of selecting a type and specifications of each of a specific launch vehicle and a specific satellite based on the desired price range, the launch vehicle information, the satellite information, the satellite image information, and information about the application field.

The launch vehicle/satellite type and specifications selection process may include selecting a type of each of the specific launch vehicle and the specific satellite based on the desired price range, the launch vehicle information, the satellite information, the satellite image information, and information about the application field, and selecting specifications of the specific launch vehicle and specifications of the specific satellite based on a maximum price within the desired price range, the specifications of the specific satellite including an operating frequency and throughput.

The satellite image platform providing method may, prior to the platform service price/support method calculation process, further include an optical signal-based satellite tracking determination process of determining whether to track the satellite using an optical signal based on a desired price range received from a terminal operated by a satellite image application company, the launch vehicle information, the satellite information, the satellite image information, and information about the application field; and a hybrid decoding control process of receiving all of a first signal and a second signal corresponding to the optical signal and a satellite signal from a specific satellite based on a maximum price within the desired price range and controlling data transmitted from the satellite to be decoded.

According to some example embodiments, the aforementioned satellite image platform providing apparatus and method using the launch vehicle-satellite-ground station-SI may provide a detailed method for price calculation through analysis of specifications for a satellite, a launch vehicle, and a ground station to provide a satellite image providing service.

The aforementioned satellite image platform providing apparatus and method using the launch vehicle-satellite-ground station-SI may provide a detailed method for a customized satellite image-based service for each of various qualities within an application field and price calculation range.

Other features and aspects will be apparent from the following detailed description, the drawings, and the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
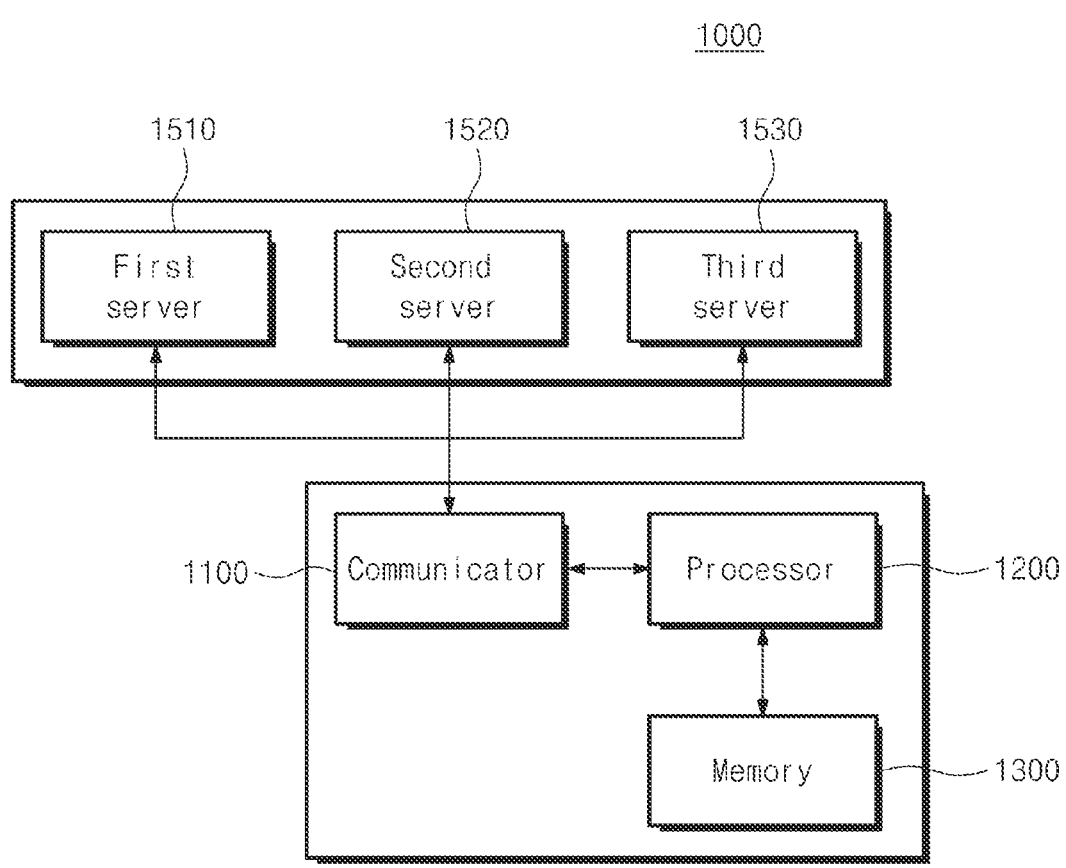
FIG. 1 illustrates an example of a configuration of a satellite image platform providing apparatus using launch vehicle-satellite-ground station-system integration (SI) according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Unless the context clearly indicates otherwise, like reference numerals refer to like elements used throughout. Also, components used herein, such as, for example, terms "-unit/module," etc., may be implemented as software and/or hardware. Depending on example embodiments, each component with "-unit/module," etc., may be implemented as a single piece of software, hardware and/or a desired part, and also may be implemented as a plurality of pieces of software, hardware, and/or desired parts.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," directly between," or "directly neighboring," etc., should be interpreted to be alike.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component S). For example, a first component may be referred to as a second component, and similarly the second component may also be referred to as the first component. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
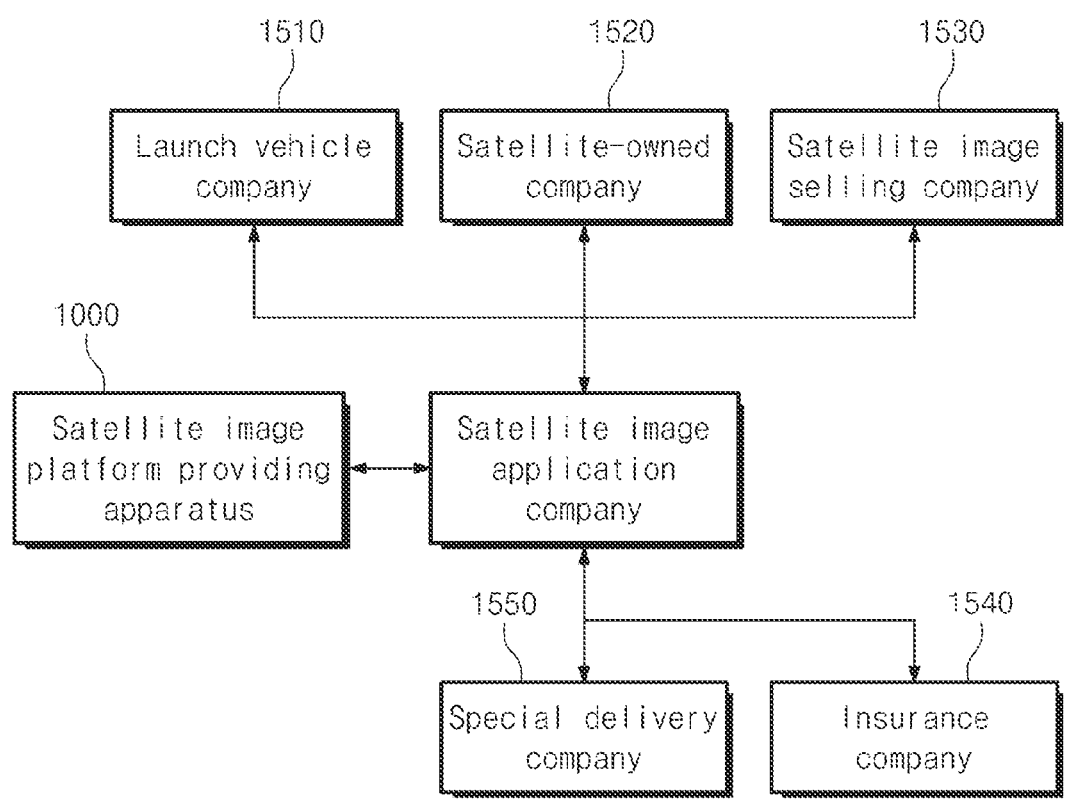
FIG. 2 illustrates an example of an interface between servers or terminals operated by companies engaged in a plurality of satellite-related industries according to an example embodiment.

Hereinafter, a satellite image platform providing apparatus and method using launch vehicle-satellite-ground station-system integration (SI) is described. FIG. 1 illustrates an example of a configuration of a satellite image platform providing apparatus using launch vehicle-satellite-ground station-SI according to an example embodiment. FIG. 2 illustrates an example of an interface between servers or terminals operated by companies engaged in a plurality of satellite-related industries according to an example embodiment.

Referring to FIG. 1, a satellite image platform providing apparatus 1000 may include a communicator 1100 and a processor 1200. The satellite image platform providing apparatus 1000 may further include a memory 1300.

Referring to FIGS. 1 and 2, a first server 1510 operated by a launch vehicle company and a second server 1520 owned by a satellite-owned company may be communicably connected to the communicator 1100. For example, the satellite image platform providing apparatus 1000 may be an apparatus operated by a satellite image application company, however, may be variously modified depending on example embodiments. As another example, the satellite image platform providing apparatus 1000 may be an apparatus operated by a satellite image selling company. As another example, the satellite image platform providing apparatus 1000 may control a satellite-based service performable between various companies listed in FIG. 2 to be generated within a desired price range.

Figure 3:
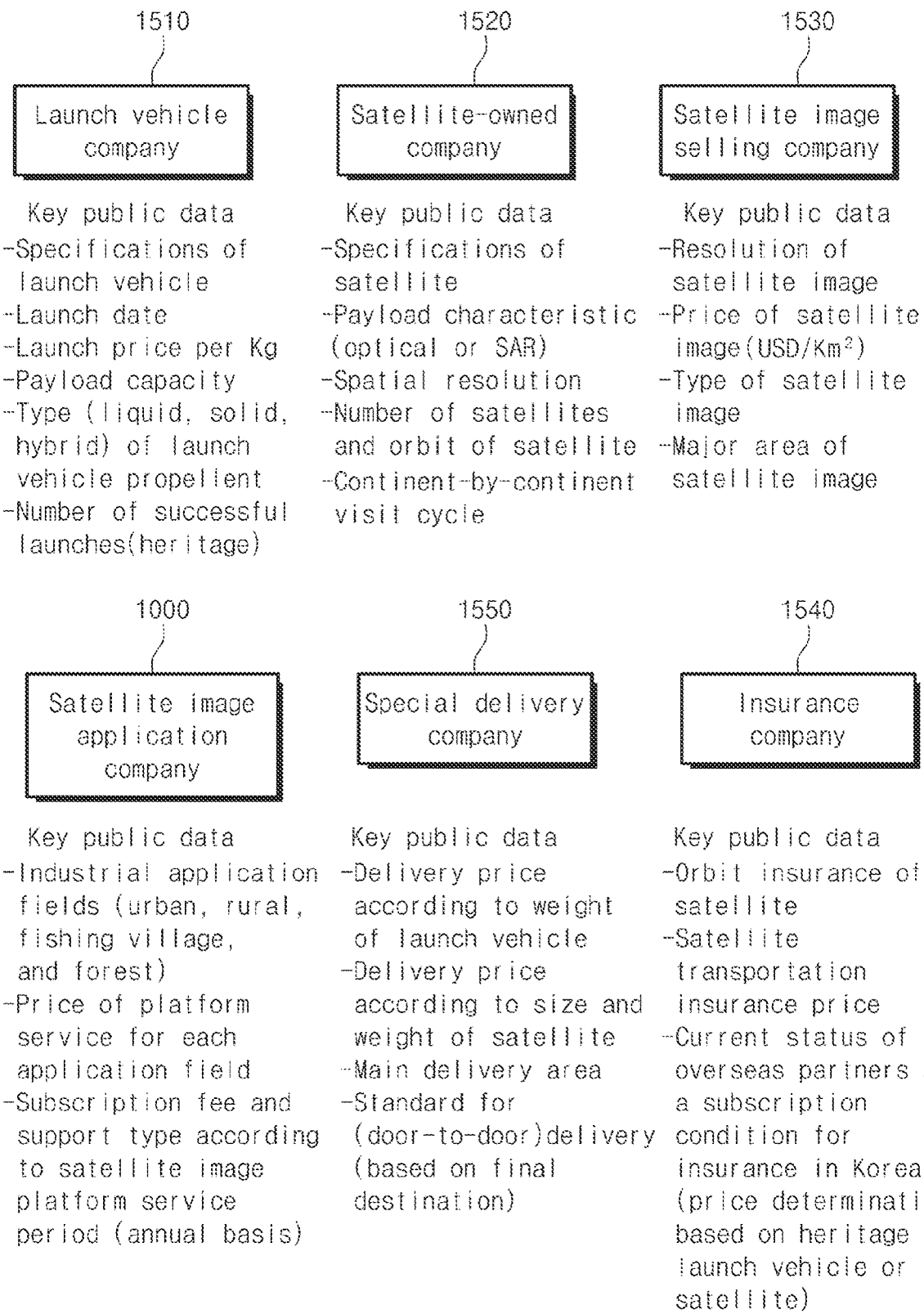
FIG. 3 illustrates an example of key public data providable from each server or apparatus to perform a satellite image platform providing method using launch vehicle-satellite-ground station-SI according to an example embodiment.

FIG. 3 illustrates an example of key public data providable from each server or apparatus to perform a satellite image platform providing method using launch vehicle-satellite-ground station-SI according to an example embodiment. Referring to FIGS. 2 and 3, the first server 1510 may provide specifications of a launch vehicle, a launch date, a launch price per kilogram (Kg), a payload capacity, a type (liquid, solid, hybrid) of launch vehicle propellent, and a number of successful launches (heritage) as public data. The second server 1520 may provide specifications of a satellite, a payload characteristic (optical or SAR), a spatial resolution, a number of satellites, an orbit of a satellite, and a continent-by-continent visit cycle as public data. Also, the second server 1520 may provide information about an operation type and throughput of the satellite, such as, for example, whether the satellite is a communication satellite, as public data.

The third server 1530 operated by the satellite image selling company may provide information about a resolution of a satellite image, a price of the satellite image (USD/Km$^2$), a type of the satellite image, and a major area of the satellite image. Through this, the satellite image platform providing apparatus 1000 operated by the satellite image application company may provide industrial application fields (urban, rural, fishing village, and forest), a price of a platform service for each application field, and a subscription fee and a support type according to a satellite image platform service period (annual basis) as public data.

A server 1550 operated by a special delivery company may provide information about a delivery price according to a weight of the launch vehicle, a delivery price according to a size and a weight of the satellite, a main delivery area, and a standard for (door-to-door) delivery (based on a final destination), and whether an insurance is included in delivery, as public data. As another example, a portion of the aforementioned information may be calculated by the satellite image platform providing apparatus 1000 and provided to the server 1550 operated by the special delivery company. A fourth server 1540 operated by an insurance company may provide information about an orbit insurance of the satellite, a satellite transportation insurance price, a current status of overseas partners and a subscription condition for insurance in Korea (price determination based on heritage of the launch vehicle or the satellite) as public data.

The satellite image platform providing apparatus 1000 may calculate information about the price of the satellite image platform service for each application field and the subscription fee and the support method according to the service period based on various types of public data. The communicator 1100 may be configured to receive launch vehicle information about specifications of the launch vehicle, a launch date, a launch price per unit weight, and a payload capacity from the first server 1510.

Here, the communicator 1100 may be configured as a wired/wireless communication device connectable to various servers. Therefore, the communicator 1100 may be configured without using a satellite communication link. When the satellite image platform providing apparatus 1000 is implemented at a ground station label, the communicator 1100 may include a separate satellite communicator in addition to a wired/wireless communication device for communication with the server. Depending on example embodiments, the satellite image platform providing apparatus 1000 may also perform a satellite image-based satellite image platform providing method while performing satellite communication. As another example, the satellite image platform providing apparatus 1000 may perform the satellite image-based satellite image platform providing method at a terminal having no satellite communication function based on public data received through other servers.

The communicator 1100 may receive launch vehicle information about specifications of a launch vehicle, a launch date, a launch price per unit weight, and a payload capacity from the first server 1510. The processor 1200 may be configured to calculate information about the price of the satellite image platform service for each application field and the subscription fee and the support method according to the service period of the satellite image platform service.

To this end, the processor 1200 may acquire satellite information about specifications of a satellite, a payload characteristic, a spatial resolution and a number of satellites, and an orbit from the second server 1520 through the communicator 1100. The processor 1200 may acquire satellite image information about a resolution of a satellite image, a price of the satellite image per unit area, a type of the satellite image, and presence or absence of specific areas in the satellite image, and a ratio of the specific areas in the satellite image from the third server 1530 through the communicator 1100.

Therefore, the processor 1200 may receive information about an application field of the satellite image and may calculate information about the price of the satellite image platform service for each application field and the subscription fee and the support method according to the service period based on the launch vehicle information, the satellite information, the satellite image information, and information about the application field.

The processor 1200 may calculate a delivery price according to a weight of the launch vehicle, a delivery price, according to a size and a weight of the satellite, and delivery cost of the launch vehicle according to availability of a delivery area and a final destination for delivery, and may calculate the delivery cost of the launch vehicle based on presence or absence of an insurance and an insurance amount when delivering the launch vehicle.

The processor 1200 may calculate information about the price of the satellite image platform service for each application field and the subscription fee and the support method according to the service period further based on the delivery cost of the launch vehicle. Here, the memory 1300 may be configured to store the aforementioned public data and information associated with the calculated cost and constraints.

The processor 1200 may acquire an insurance related to maintaining the orbit of the satellite, a satellite transportation insurance price, a current status of overseas partners for insurance, and insurance and price determination information related to determining a price based on a heritage status of the satellite or the launch vehicle from the fourth server 1540 through the communicator 1100. Here, the heritage status of the launch vehicle may represent whether there is the right to use the launch vehicle within a desired period in a form of rental from an owner in addition to a method of directly owning the launch vehicle. The processor 1200 may calculate information about the price of the satellite image platform service for each application field and the subscription fee and the support method according to the service period further based on the insurance and price determination information.

The processor 1200 may receive information about a desired price range and desired specifications from a terminal operated by the satellite image application company that desires to provide the satellite image platform service for each application field through the communicator 1100. The processor 1200 may select a type and specifications of each of a specific launch vehicle, a specific satellite, and a specific satellite image based on the desired price range, the launch vehicle information, the satellite information, the satellite image information, and the information about the application field.

The processor 1200 may select a type of each of the specific launch vehicle and the specific satellite based on the desired price range, the launch vehicle information, the satellite information, the satellite image information, and information about the application field. The processor 1200 may select specifications of the specific launch vehicle and specifications of the specific satellite based on a maximum price within the desired price range. The specifications of the specific satellite may include an operating frequency and throughput and may further include other information.

The processor 1200 may select a type of each of the specific launch vehicle and the specific satellite based on the desired specifications, the satellite information, the satellite image information, and information about the application field. The processor 1200 may select specifications of the specific launch vehicle and specifications of the specific satellite based on the desired specifications. The specifications of the specific launch vehicle may include a type of a propellant that includes liquid, solid, and hybrid. The specifications of the specific satellite may further include continent-by-continent visit cycle information.

A satellite image platform providing apparatus according to an aspect is described above. Hereinafter, a satellite image platform providing method according to another aspect is described. The aforementioned technical features, operations, and configurations may apply to the following satellite image platform providing method.

Figure 4:
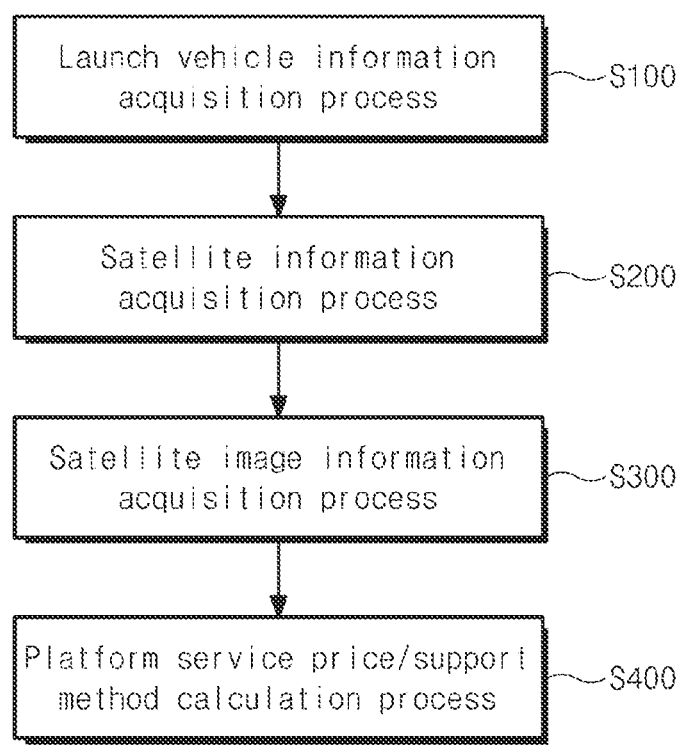
FIG. 4 is a flowchart illustrating an example of a satellite image platform providing method using a launch vehicle-satellite-ground station-SI according to an example embodiment.

FIG. 4 is a flowchart illustrating an example of a satellite image platform providing method using launch vehicle-satellite-ground station-SI according to an example embodiment. Referring to FIGS. 1 to 4, the satellite image platform providing method may be performed by a ground station or a terminal connected to the ground station. Referring to FIGS. 1 to 4, the satellite image platform providing method may include a launch vehicle information acquisition process S100, a satellite information acquisition process S200, a satellite image information acquisition process S300, and a platform service price/support method calculation process S400. The order of the launch vehicle information acquisition process S100, the satellite information acquisition process 200, and the satellite image information acquisition process S300 may be variously modified depending on example embodiments or at least two thereof may be simultaneously performed.

In the launch vehicle information acquisition process S100, launch vehicle information about specifications of a launch vehicle, a launch date, a launch price per unit weight, and a payload capacity may be acquired from a first server. In the satellite information acquisition process S200, satellite information about specifications of a satellite, a payload characteristic, a spatial resolution and a number of satellites, and an orbit may be acquired from a second server. In the satellite image information acquisition process S300, satellite image information about a resolution of a satellite image, a price of the satellite image per unit area, a type of the satellite image, presence or absence of specific areas in the satellite image, and a ratio of the specific areas in the satellite image may be acquired from a third server.

In the platform service price/support method calculation process S400, information about an application field of the satellite image may be received and information about a price of a satellite image platform service for each application field and a subscription fee and a support method according to a service period of the satellite image platform service may be calculated based on the launch vehicle information, the satellite information, the satellite image information, and information about the application field.

Figure 5:
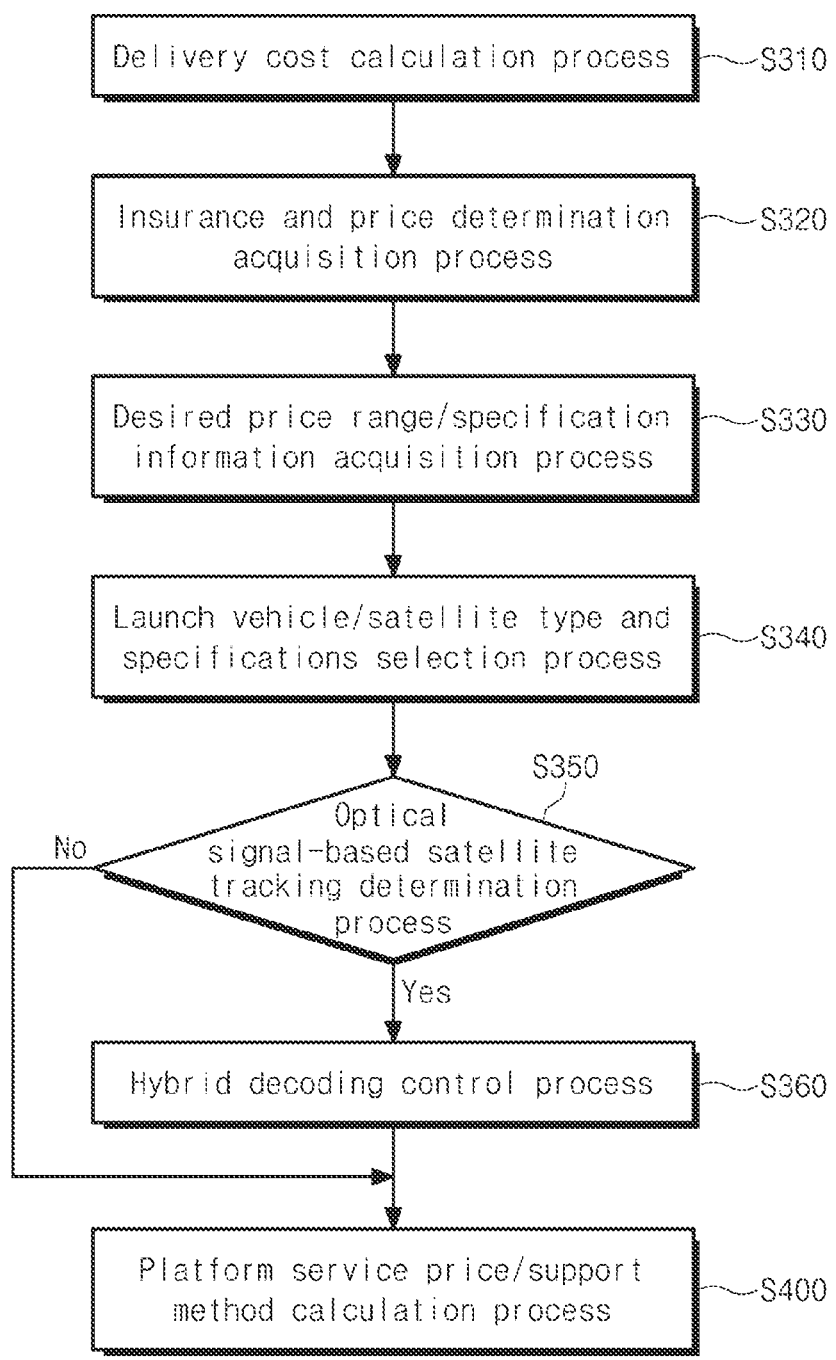
FIG. 5 is a flowchart illustrating an example of processes performed prior to a platform service price/support method calculation process according to an example embodiment.

FIG. 5 is a flowchart illustrating an example of processes performed prior to a platform service price/support method calculation process according to an example embodiment. Referring to FIGS. 4 and 5, prior to the platform service price/support method calculation process S400, a delivery cost calculation process S310 may be performed. In the delivery cost calculation process S310, a delivery price according to a weight of the launch vehicle, a delivery price according to a size and a weight of the satellite, and delivery cost of the launch vehicle according to availability of a delivery area and a final destination for delivery may be calculated. In the delivery cost calculation process S310, the delivery cost of the launch vehicle may be calculated based on presence or absence of an insurance and an insurance amount when delivering the launch vehicle. Therefore, in the platform service price/support method calculation process S400, information about the price of the satellite image platform service for each application field and the subscription fee and the support method according to the service period of the satellite image platform service may be calculated further based on the delivery cost of the launch vehicle.

Prior to the platform service price/support method calculation process S400, an insurance and price determination acquisition process S320 may be performed. In the insurance and price determination acquisition process S320, an insurance related to maintaining the orbit of the satellite, a satellite transportation insurance price, a current status of overseas partners for reinsurance, and insurance and price determination information related to determining a price based on a heritage status of the satellite or the launch vehicle may be acquired from a fourth server. Therefore, in the platform service price/support method calculation process S400, information about the price of the satellite image platform service for each application field and the subscription fee and the support method according to the service period may be calculated further based on the insurance and price determination information.

Prior to the platform service price/support method calculation process S400, a desired price range/specification information acquisition process S330 and a launch vehicle/satellite type and specifications selection process S340 may be performed. In the desired price range/specification information acquisition process S330, information about a desired price range and desired specifications may be acquired from a terminal operated by a satellite image application company that desires to provide the satellite image platform service for each application field. In the launch vehicle/satellite type and specifications selection process S340, a type and specifications of each of a specific launch vehicle and a specific satellite may be selected based on the desired price range, the launch vehicle information, the satellite information, the satellite image information, and information about the application field.

In detail, in the launch vehicle/satellite type and specifications selection process S340, a type of each of the specific launch vehicle and the specific satellite may be selected based on the desired price range, the launch vehicle information, the satellite information, the satellite image information, and information about the application field. Also, in the launch vehicle/satellite type and specifications selection process S340, specifications of the specific launch vehicle and specifications of the specific satellite may be selected based on a maximum price within the desired price range. In this case, the specifications of the specific satellite may include an operating frequency and throughput Prior to the platform service price/support method calculation process S400, an optical signal-based satellite tracking determination process S350 and a hybrid decoding control process S360 may be performed. In the optical signal-based satellite tracking determination process S350, whether to track the satellite using an optical signal may be determined based on a desired price range received from a terminal operated by a satellite image application company, the launch vehicle information, the satellite information, the satellite image information, and information about the application field. In the hybrid decoding control process S360, all of a first signal and a second signal corresponding to the optical signal and a satellite signal may be received from the specific satellite based on a maximum price within the desired price range and data transmitted from the satellite may be controlled to be decoded. When it is determined to not use a hybrid scheme using an optical signal, the platform service price/support method calculation process S400 may be performed without performing the hybrid decoding control process 360.

The satellite image platform providing apparatus and method using launch vehicle-satellite-ground station-SI is described above. The technical effect of the satellite image platform providing apparatus and method using the launch vehicle-satellite-ground station-SI according to the example embodiment is described below.

According to some example embodiments, the aforementioned satellite image platform providing apparatus and method using the launch vehicle-satellite-ground station-SI may provide a detailed method for price calculation through analysis of specifications for a satellite, a launch vehicle, and a ground station to provide a satellite image providing service.

The aforementioned satellite image platform providing apparatus and method using the launch vehicle-satellite-ground station-SI may provide a detailed method for a customized satellite image-based service for each of various qualities within an application field and price calculation range.

The satellite image platform providing method using launch vehicle-satellite-ground station-SI according to the example embodiments may be implemented in a form of a program executable by a computer apparatus. For example, the program may include, alone or in combination with program instructions, data files, data structures, and the like. The program may be designed and manufactured using a machine code or a higher level code. The program may be specially designed to implement the satellite image platform providing method and may be implemented using various functions or definitions well-known and available to those having skill in the computer software arts. Also, a computer apparatus in which the program is executable may include a processor, a memory, and the like to implement functions of the program and, if necessary, may further include a communication apparatus.

The program for implementing the satellite image platform providing method using the launch vehicle-satellite-ground station-SI may be recorded in non-transitory computer-readable media. Examples of the non-transitory computer-readable media may include magnetic media such as hard discs and floppy discs; optical media such as CD-ROM discs and DVDs; magneto-optical media such as floptical discs; and hardware apparatus that are specially configured to store and perform a specific program executed in response to call of a computer, such as ROM, RAM, flash memory.

A number of example embodiments regarding the satellite image platform providing method and device using the launch vehicle-satellite-ground station-SI have been described above. Nonetheless, it should be understood that various modifications may be made to these example embodiments. For example, various apparatuses or methods achieved by one of ordinary skill in the art through alterations and modifications thereto may be an example embodiment of the satellite image platform providing method and device using the launch vehicle-satellite-ground station-SI. For example, suitable results may be achieved if the described techniques are performed in a different order and/or if components in a described system, architecture, apparatus, or circuit are combined in a different manner and/or replaced or supplemented by other components or their equivalents. Accordingly, other implementations are still within the scope of the following claims.

What is claimed is:

1. A satellite image platform providing apparatus using launch vehicle-satellite-ground station-system integration (SI), the satellite image platform providing apparatus comprising:
   a communicator configured to receive launch vehicle information about specifications of a launch vehicle, a launch date, a launch price per unit weight, and a payload capacity from a first server; and
   a processor configured to calculate information about a price of a satellite image platform service for each application field and a subscription fee and a support method according to a service period of the satellite image platform service,
   wherein the processor is configured to
   acquire satellite information about specifications of a satellite, a payload characteristic, a spatial resolution and a number of satellites, and an orbit from a second server through the communicator,
   acquire satellite image information about a resolution of a satellite image, a price of the satellite image per unit area, a type of the satellite image, presence or absence of specific areas in the satellite image, and a ratio of the specific areas in the satellite image from a third server through the communicator, and
   receive information about an application field of the satellite image and calculate information about the price of the satellite image platform service for each application field and the subscription fee and the support method according to the service period based on the launch vehicle information, the satellite information, the satellite image information, and information about the application field.

2. The satellite image platform providing apparatus of claim 1, wherein the processor is configured to
   calculate a delivery price according to a weight of the launch vehicle, a delivery price according to a size and a weight of the satellite, and delivery cost of the launch vehicle according to availability of a delivery area and a final destination for delivery, and calculate the delivery cost of the launch vehicle based on presence or absence of an insurance and an insurance amount when delivering the launch vehicle, and
   calculate information about the price of the satellite image platform service for each application field and the subscription fee and the support method according to the service period, further based on the delivery cost of the launch vehicle.

3. The satellite image platform providing apparatus of claim 1, wherein the processor is configured to
   acquire an insurance related to maintaining the orbit of the satellite, a satellite transportation insurance price, a current status of overseas partners for reinsurance, and insurance and price determination information related to determining a price based on a heritage status of the satellite or the launch vehicle from a fourth server through the communicator, and calculate information about the price of the satellite image platform service for each application field and the subscription fee and the support method according to the service period further based on the insurance and price determination information.

4. The satellite image platform providing apparatus of claim 1, wherein the processor is configured to receive information about a desired price range and desired specifications from a terminal operated by a satellite image application company that desires to provide the satellite image platform service for each application field, through the communicator, and select a type and specifications of each of a specific launch vehicle, a specific satellite, and a specific satellite image based on the desired price range, the launch vehicle information, the satellite information, the satellite image information, and information about the application field.

5. The satellite image platform providing apparatus of claim 4, wherein the processor is configured to select a type of each of the specific launch vehicle and the specific satellite based on the desired price range, the launch vehicle information, the satellite information, the satellite image information, and information about the application field, and select specifications of the specific launch vehicle and specifications of the specific satellite based on a maximum price within the desired price range, the specifications of the specific satellite comprising an operating frequency and throughput.

6. The satellite image platform providing apparatus of claim 4, wherein the processor is configured to select a type of each of the specific launch vehicle and the specific satellite based on the desired specifications, the satellite information, the satellite image information, and information about the application field, and select specifications of the specific launch vehicle and specifications of the specific satellite based on the desired specifications, the specifications of the specific launch vehicle comprising a type of a propellant comprising liquid, solid, and hybrid, and the specifications of the specific satellite further comprising continent-by-continent visit cycle information.

7. The satellite image platform providing apparatus of claim 4, wherein the processor is configured to determine whether to track the satellite using an optical signal based on the desired price range, the launch vehicle information, the satellite information, the satellite image information, and information about the application field, and receive all of a first signal and a second signal corresponding to the optical signal and a radio frequency (RF) signal from the specific satellite based on a maximum price within the desired price range, and control data transmitted from the satellite to be decoded.

8. A satellite image platform providing method using launch vehicle-satellite-ground station-system integration (SI), wherein the satellite image platform providing method is performed by a ground station or a terminal connected to the ground station and comprises:

a launch vehicle information acquisition process of acquiring launch vehicle information about specifications of a launch vehicle, a launch date, a launch price per unit weight, and a payload capacity from a first server;

a satellite information acquisition process of acquiring satellite information about specifications of a satellite, a payload characteristic, a spatial resolution and a number of satellites, and an orbit from a second server;

a satellite image information acquisition process of acquiring satellite image information about a resolution of a satellite image, a price of the satellite image per unit area, a type of the satellite image, presence or absence of specific areas in the satellite image, and a ratio of the specific areas in the satellite image from a third server; and a platform service price/support method calculation process of receiving information about an application field of the satellite image and calculating information about a price of a satellite image platform service for each application field and a subscription fee and a support method according to a service period of the satellite image platform service based on the launch vehicle information, the satellite information, the satellite image information, and information about the application field.

9. The satellite image platform providing method of claim 8, prior to the platform service price/support method calculation process, further comprising:

a delivery cost calculation process of calculating a delivery price according to a weight of the launch vehicle, a delivery price according to a size and a weight of the satellite, and delivery cost of the launch vehicle according to availability of a delivery area and a final destination for delivery, wherein the delivery cost calculation process comprises calculating the delivery cost of the launch vehicle based on presence or absence of an insurance and an insurance amount when delivering the launch vehicle, and the platform service price/support method calculation process comprises calculating information about the price of the satellite image platform service for each application field and the subscription fee and the support method according to the service period, further based on the delivery cost of the launch vehicle.

10. The satellite image platform providing method of claim 8, prior to the platform service price/support method calculation process, further comprising:

an insurance and price determination information acquisition process of acquiring an insurance related to maintaining the orbit of the satellite, a satellite transportation insurance price, a current status of overseas partners for reinsurance, and insurance and price determination information related to determining a price based on a heritage status of the satellite or the launch vehicle from a fourth server, wherein the platform service price/support method calculation process comprises calculating information about the price of the satellite image platform service for each application field and the subscription fee and the support method according to the service period further based on the insurance and price determination information.

11. The satellite image platform providing method of claim 8, prior to the platform service price/support method calculation process, further comprising:

a desired price range/specifications information acquisition process of acquiring information about a desired price range and desired specifications from a terminal operated by a satellite image application company that desires to provide the satellite image platform service for each application field; and a launch vehicle/satellite type and specifications selection process of selecting a type and specifications of each of a specific launch vehicle and a specific satellite based on the desired price range, the launch vehicle information, the satellite information, the satellite image information, and information about the application field, wherein the launch vehicle/satellite type and specifications selection process comprises:

selecting a type of each of the specific launch vehicle and the specific satellite based on the desired price range, the launch vehicle information, the satellite information, the satellite image information, and information about the application field, and selecting specifications of the specific launch vehicle and specifications of the specific satellite based on a maximum price within the desired price range, the specifications of the specific satellite comprising an operating frequency and throughput.

12. The satellite image platform providing method of claim 8, prior to the platform service price/support method calculation process, further comprising:

an optical signal-based satellite tracking determination process of determining whether to track the satellite using an optical signal based on a desired price range received from a terminal operated by a satellite image application company, the launch vehicle information, the satellite information, the satellite image information, and information about the application field; and a hybrid decoding control process of receiving all of a first signal and a second signal corresponding to the optical signal and a satellite signal from a specific satellite based on a maximum price within the desired price range and controlling data transmitted from the satellite to be decoded.

* * * * *